(12) United States Patent
Sinzig et al.

(10) Patent No.: US 8,239,782 B2
(45) Date of Patent: Aug. 7, 2012

(54) DATA PROCESSING SYSTEM AND METHOD OF DATA ENTRY

(75) Inventors: Werner Sinzig, Nussloch (DE); Andreas Vogel, San Francisco, CA (US)

(73) Assignee: SAP AG, Walldorf (DE)

( * ) Notice: Subject to any disclaimer, the term of this patent is extended or adjusted under 35 U.S.C. 154(b) by 492 days.

(21) Appl. No.: 11/066,229

(22) Filed: Feb. 25, 2005

(65) Prior Publication Data

US 2005/0198564 A1 Sep. 8, 2005

Related U.S. Application Data (60) Provisional application No. 60/547,878, filed on Feb. 27, 2004.

(51) Int. Cl.
*G06F 3/048* (2006.01)

(52) U.S. Cl. ........ 715/776; 715/742; 715/744; 715/753; 715/765; 715/777; 715/783; 715/804; 715/810; 715/819; 715/820

(58) Field of Classification Search .................. 715/780, 715/742, 744, 752, 765, 776, 783, 804, 818, 715/819, 820, 854, 844

See application file for complete search history.

(56) References Cited

U.S. PATENT DOCUMENTS

| | | | | |
|---|---|---|---|---|
| 5,774,887 A * | 6/1998 | Wolff et al. | ............................ | 1/1 |
| 5,951,639 A * | 9/1999 | MacInnis | ......................... | 725/70 |
| 6,058,426 A * | 5/2000 | Godwin et al. | ................ | 709/229 |
| 6,345,278 B1 * | 2/2002 | Hitchcock et al. | ......... | 707/104.1 |
| 6,487,723 B1 * | 11/2002 | MacInnis | ....................... | 725/132 |
| 6,567,822 B1 * | 5/2003 | Cudahy et al. | .......................... | 1/1 |
| 6,581,067 B1 * | 6/2003 | Bjergo et al. | .......................... | 1/1 |
| 6,711,554 B1 * | 3/2004 | Salzmann et al. | .............. | 705/64 |
| 7,007,239 B1 * | 2/2006 | Hawkins et al. | .............. | 715/780 |
| 7,020,254 B2 * | 3/2006 | Phillips | ..................... | 379/114.04 |
| 7,027,975 B1 * | 4/2006 | Pazandak et al. | .................. | 704/9 |
| 7,080,325 B2 * | 7/2006 | Treibach-Heck et al. | .... | 715/780 |
| 7,106,851 B2 * | 9/2006 | Tang et al. | ................ | 379/355.01 |
| 7,509,379 B2 * | 3/2009 | Degraeve | ....................... | 709/206 |
| 2001/0014864 A1 * | 8/2001 | Tazuru | ............................. | 705/1 |
| 2001/0049274 A1 * | 12/2001 | Degraeve | ........................ | 455/412 |
| 2002/0052781 A1 * | 5/2002 | Aufricht et al. | ................. | 705/14 |
| 2002/0052916 A1 * | 5/2002 | Kloba et al. | ................... | 709/203 |
| 2002/0080158 A1 * | 6/2002 | Storfer et al. | ................. | 345/700 |
| 2002/0107885 A1 * | 8/2002 | Brooks et al. | ................. | 707/505 |
| 2002/0156797 A1 * | 10/2002 | Lee et al. | ...................... | 707/200 |
| 2003/0028899 A1 * | 2/2003 | MacInnis | ....................... | 725/132 |
| 2003/0093483 A1 * | 5/2003 | Allen et al. | .................... | 709/207 |
| 2003/0105642 A1 * | 6/2003 | Andino et al. | .................... | 705/1 |

(Continued)

OTHER PUBLICATIONS

Myllymaki, Effective Web Data Extraction with Standard XML Technologies, IBM Almaden Research Center, May 2-5, 2001.*

(Continued)

*Primary Examiner* — Boris Pesin
*Assistant Examiner* — John Heffington
(74) *Attorney, Agent, or Firm* — Finnegan, Henderson, Farabow, Garrett & Dunner LLP (57) ABSTRACT

A data processing system includes telecommunication means for providing a data entry form to a client device and for receiving user data that has been entered into the data entry form from the client device, database means for storage of the user data, and program means for extracting application specific data from the database means.

20 Claims, 6 Drawing Sheets

U.S. PATENT DOCUMENTS

| | | | |
|---|---|---|---|
| 2003/0212602 A1* | 11/2003 | Schaller | 705/22 |
| 2004/0024711 A1* | 2/2004 | Camping et al. | 705/64 |
| 2004/0081301 A1* | 4/2004 | Phillips | 379/114.06 |
| 2004/0093318 A1* | 5/2004 | Vogel | 707/1 |
| 2004/0122829 A1* | 6/2004 | Sakurai et al. | 707/100 |
| 2004/0141599 A1* | 7/2004 | Tang et al. | 379/93.24 |
| 2004/0153360 A1* | 8/2004 | Schumann | 705/10 |
| 2005/0138558 A1* | 6/2005 | Duevel et al. | 715/700 |
| 2006/0077462 A1* | 4/2006 | Saito | 358/1.15 |
| 2006/0079211 A1* | 4/2006 | Degraeve | 455/412.1 |
| 2006/0167704 A1* | 7/2006 | Nicholls et al. | 705/1 |
| 2006/0177803 A1* | 8/2006 | Pennington et al. | 434/219 |
| 2006/0236241 A1* | 10/2006 | Harada et al. | 715/700 |
| 2006/0271853 A1* | 11/2006 | Marcos et al. | 715/700 |
| 2007/0100861 A1* | 5/2007 | Novy | 707/101 |
| 2007/0206606 A1* | 9/2007 | Coleman et al. | 370/395.52 |

OTHER PUBLICATIONS

Ask Search, http://www.ask.com/web?q=extract+data+%28input+or+entry%29+form&qsrc=1&o=0&I... .*

Ask Search, http://www.ask.com/web?q=extract+%28program+or+application%29+specific+data&sea... .*

* cited by examiner

DATA PROCESSING SYSTEM AND METHOD OF DATA ENTRY

CROSS-REFERENCE TO RELATED APPLICATION

The present application claims the benefit of priority of U.S. Provisional Application No. 60/547,878 filed Feb. 27, 2004, titled EXPRESS METHOD PLANNING SYSTEM in the names of Werner SINZIG and Andreas VOGEL, the disclosure of which is expressly incorporated by reference to its entirety.

DESCRIPTION OF THE INVENTION

1. Field of the Invention

The present invention relates to the field of data processing, and more particularly without limitation to data entry, in particular data entry of business related data for planning purposes.

2. Background of the Invention

Typically, business planning data is collected from line managers at more or less regular time intervals. The planning data is analyzed for various business purposes, such as budget planning, scenario planning, investment planning and/or risk assessment. The duty of providing planning data is an addition to the line manager's day to day business tasks. Therefore, there is a need for a method of collecting the data in a way which integrates with line manager's day to day business activities and tasks.

Moreover, there is a need to collect the data from the line managers in a way such that the further use of the collected data for various applications is facilitated, in particular in order to avoid a need for duplicated manual input of the data.

SUMMARY OF THE INVENTION

In accordance with the present invention there is provided a data processing system comprising telecommunication means for providing a data entry form to a client device and for receiving user data that has been entered into the data entry form by a user, database means for storage of the user data, and program means for extracting application specific data from the database means.

For example, a line manager can connect to a web portal in order to obtain a pre-selected data entry form. The line manager can enter user data, such as business planning data, into the data entry form using his or her PC. After completion of the data entry, the user data is submitted for storage in a database that is coupled to the web portal. The uploaded user data is then extracted from the database in order to provide sub-sets of the user data to respective applications for further processing and analysis.

In accordance with an embodiment of the invention the web portal has storage means for temporarily storing a partially filled out data entry form until data entry has been completed. This has the advantage that a line manager can interrupt the data entry process, e.g., in order to perform an intervening and/or more urgent business task or obligation. In this instance the line manager can store the partially completed data entry form in order to resume the data entry operation at a later point of time without having to restart from the beginning.

In accordance with an embodiment of the invention a planning coordinator can select a data entry form from a plurality of stored data entry forms. In addition the planning coordinator can select a stored user group to which the selected data entry form is to be provided. For example, the user group is stored in the form of a list of email addresses to which the selected data entry form or a hyperlink to the selected data entry form is emailed.

In accordance with an embodiment of the invention the data entry form has a sequence or "train" of icons. Each icon of the sequence is representative of a data entry window of the data entry form. The sequence of icons is roughly proportional to the amount of time it takes to enter the user data into the data entry form and can thus facilitate the line manager's time planning for the performance of the data entry during his or her business day.

In accordance with a preferred embodiment of the invention each data entry window of the data entry form has a completion button. The completion button is to be pressed when the entry of the user data into the data entry window has been completed. In response a completion mark, such as a check mark, is displayed next to the icon that represents the data entry window for which data entry has been completed. Hence, the progress of the data entry task is visualized for the user, e.g. the line manager.

In accordance with a further embodiment of the invention the data entry form has a portion for displaying a list of the data entry windows of that data entry form. User data is to be entered into each of the data entry windows for completion of the data entry into the data entry form.

In accordance with a further embodiment of the invention the last data entry window in the sequence of data entry windows serves for display of the previously entered user data in order to facilitate a user's review of the user data for completeness and correctness before the user data is submitted and uploaded to the web portal.

In another aspect the present invention relates to a client device that can be used for entry of data into a data entry form. For example, the client device has a web interface for receiving the HTML coded data entry form. The data entry form is displayed on a graphical user interface of the client device for entry of the user data.

The present invention is broadly applicable for various kinds of data entry tasks, including but not limited to business data, business planning data, financial data, human resources data, budget data, scenario planning data, and/or other business related data.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

In the following embodiments of the invention will be described in greater detail by way of example only making reference to the drawings in which.

DESCRIPTION OF THE EMBODIMENTS

Figure 1:
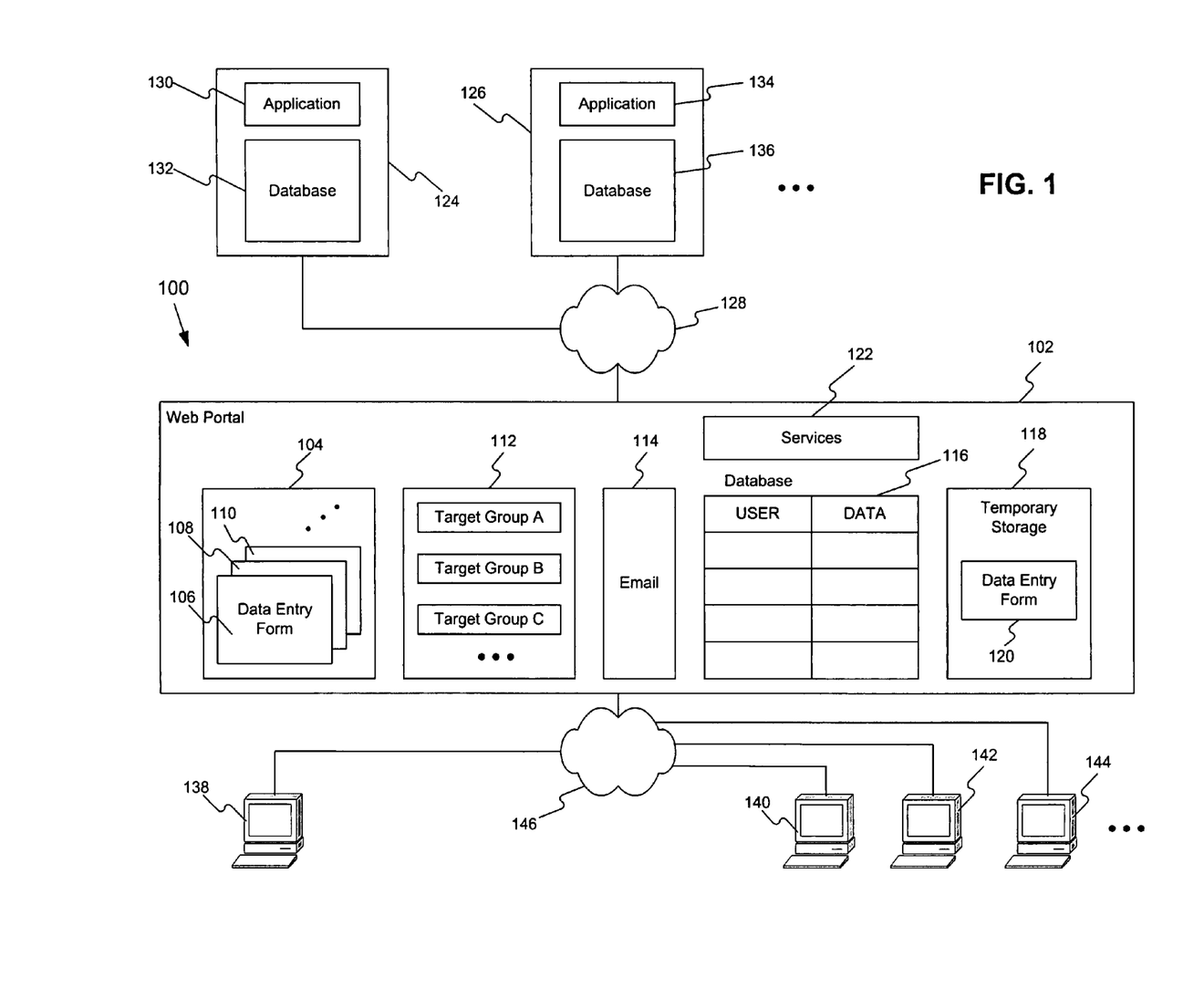
FIG. 1 is a block diagram of a data processing system.

FIG. 1 shows a data processing system 100 that has a web portal 102. The web portal 102 has a storage 104 for storage of various data entry forms 106, 108, and 110. Storage 104 may have other data entry forms in addition to forms 106, 108, and 110.

Further, the data processing system 100 has storage 112 for storage of various target groups such as target group A, target group B, and target group C. Storage 112 may have other target groups in addition to target groups A, B, and C.

In one embodiment, each target group is constituted by a list of email addresses for identification of the members of each target group. Alternatively or in addition the target group can contain a list of other user identifiers.

The web portal 102 has an email program 114 for sending email messages. The database 116 of the web portal 102 serves for storage of user data that has been entered into the data entry forms and uploaded to the web portal 102. For example, the user data that has been entered by a user into one of the data entry forms is stored in the database 116 using an identifier of that user as a database key.

The temporary storage 118 of the web portal 102 serves for storage of partially completed user data, e.g. when a user has to interrupt the data entry process. Storage of the partially completed user data 120 with or without the respective data entry form has the advantage that the user does not need to re-enter the partially completed user data for when he or she resumes the data entry task at a later point of time.

Further, the web portal 102 has one or more services 122, i.e. programs for extracting application specific sets of user data from the database 116 in order to provide such application specific sets of user data to respective applications that are coupled to the data processing system 100.

In one embodiment, the server computer 124, the server computer 126 are coupled to the web portal 102 by means of a network 128. Although not shown in FIG. 1, other server computers may be connected to network 128. The server computer 124 serves for execution of an application program 130 and provides a database 132 that contains the application specific data required by the application program 130. Likewise, the server computer 126 serves for execution of an application program 134 that requires the database 136.

Examples for the application programs 130 and 134 include financial applications, human resources applications, investment planning applications, budget planning applications, risk and scenario planning applications and/or other business related application programs.

A number of user devices 138, 140, 142, and 144 are coupled to the web portal 102 via a network 146. The network 146 may or may not be identical with the network 128. For example, the network 146 is an intranet, a virtual private network or the Internet. Although not shown in FIG. 1, other user devices may be coupled to web portal 102 via network 146.

The user devices 138, 140, 142, and 144 can be personal computers, portable computers and/or other electronic devices that have a telecommunication interface with HTML (Hypertext Markup Language) capability. Typically the HTML capability will be provided by a standard Internet browser program, such as Netscape Navigator or Microsoft Explorer.

In the example considered here, the user device 138 belongs to a planning coordinator whereas the user devices 140, 142, and 144 belong to line managers.

In operation the planning coordinator connects to the web portal 102 by means of his or her user device 138. The planning coordinator has access authorization for selection of one of the data entry forms 106, 108, and 110 from the storage 104, for editing of one of these data entry forms and/or for submission of a new data entry form for storage in the storage 104. Further, the planning coordinator has the authorization to select, and/or edit the target groups stored in the storage 112 and/or for adding a new target group. After selection of one of the data entry forms 106, 108, and 110 and after selection of one of the target groups from the storage 112 by the planning coordinator email messages are sent out automatically by the email program 114 to all members of the selected target group. Although not shown in FIG. 1, storage 104 may contain other data entry forms in addition to 106, 108, and 110.

The receipt of the data entry form by the members of the selected target group serves as a trigger for performance of the respective data entry task. After data entry into the data entry form has been completed by one of the users of the selected target group, the respective user data is uploaded into the web portal 102 and stored in the database 116. If the data entry process needs to be interrupted by the one of the users the partially completed user data 120 that has already been entered into the data entry form is temporarily stored in the temporary storage 118 from where it is retrieved when the data entry is resumed by that user.

After completion of all data entries into the data entry form by all members of the target group the services 122 are invoked in order to extract application specific sub-sets of the user data from the database 116. The extracted sub-sets of the user data are then sent from the web portal 102 to the respective databases 132 and 136 for further use by the respective application programs 130 and 134.

Figure 2:
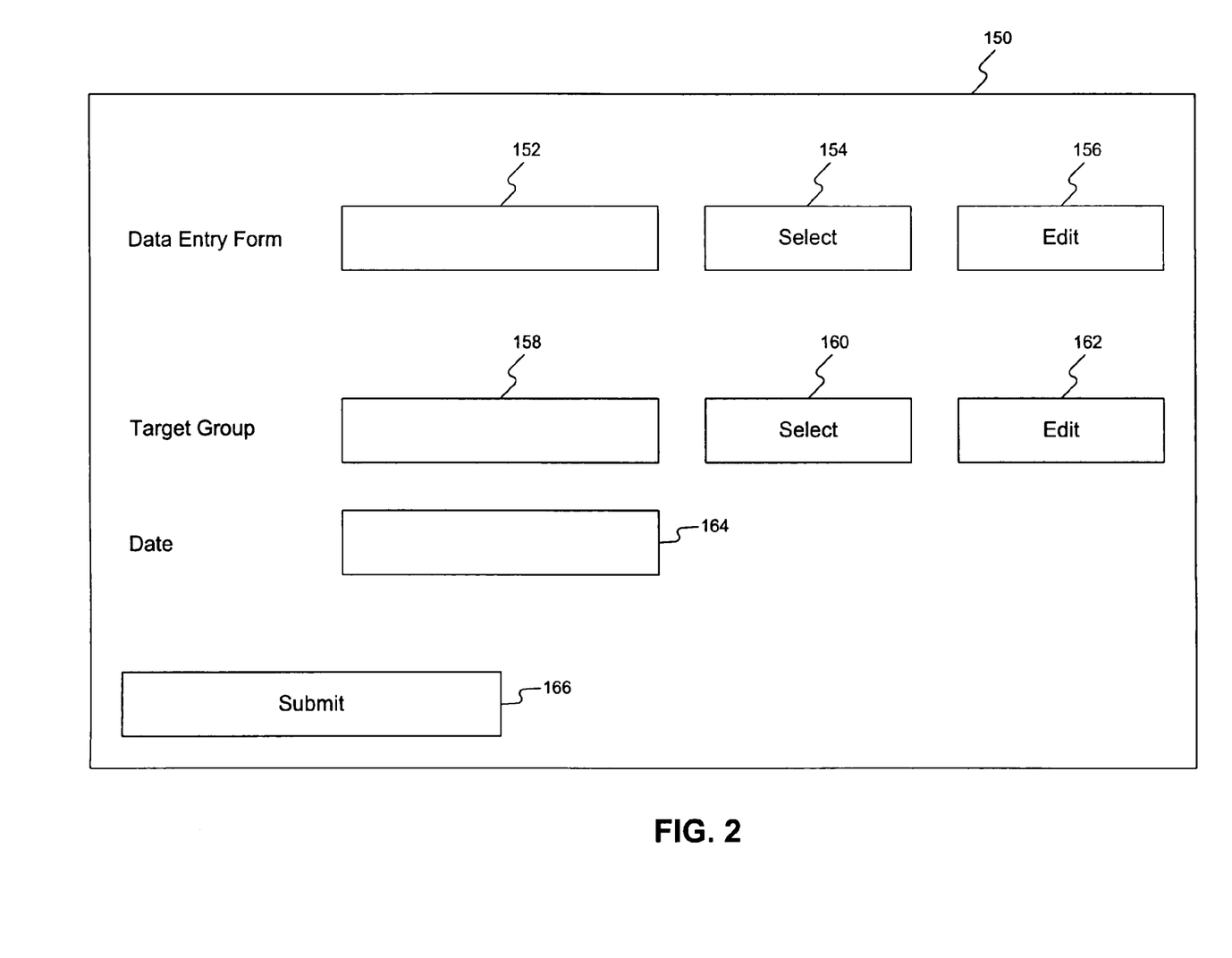
FIG. 2 is a window for a planning coordinator's selection of a data entry form and target group.

FIG. 2 shows a window 150 that is displayed on the screen of the user device 138 (cf. FIG. 1) of the planning coordinator. The window 150 serves for the planning coordinator's selection of a data entry form, a target group and optionally a start date for starting the data collection process.

The window 150 has a data entry field 152 for entry of a path to one of the data entry forms stored in the storage 104, a button 154 for selection of a respective data entry form and a button 156 for editing the data entry form. Likewise the window 150 has a data entry field 158 for entry of a path of one of the target groups stored in the storage 112 and a button 160 for selection of the respective target group and a button 162 for editing the respective target group identified by the path in the data entry field 158. As an option the planning coordinator can enter a date into the data entry field 164. Further, the window 150 has a submit button 166.

By clicking on the submit button 166 the selected data entry form, the selected target group and the start date, if any, is transmitted to the web portal 102 (cf. FIG. 1) from the user device 138.

If a start date has been indicated, the data entry form or hyperlink to the data entry form will be emailed to all members of the target group when the start date has been reached. Otherwise the email message with the data entry form or a hyperlink to the data entry form is sent out to all members of the selected target group immediately or after some delay.

Figure 3:
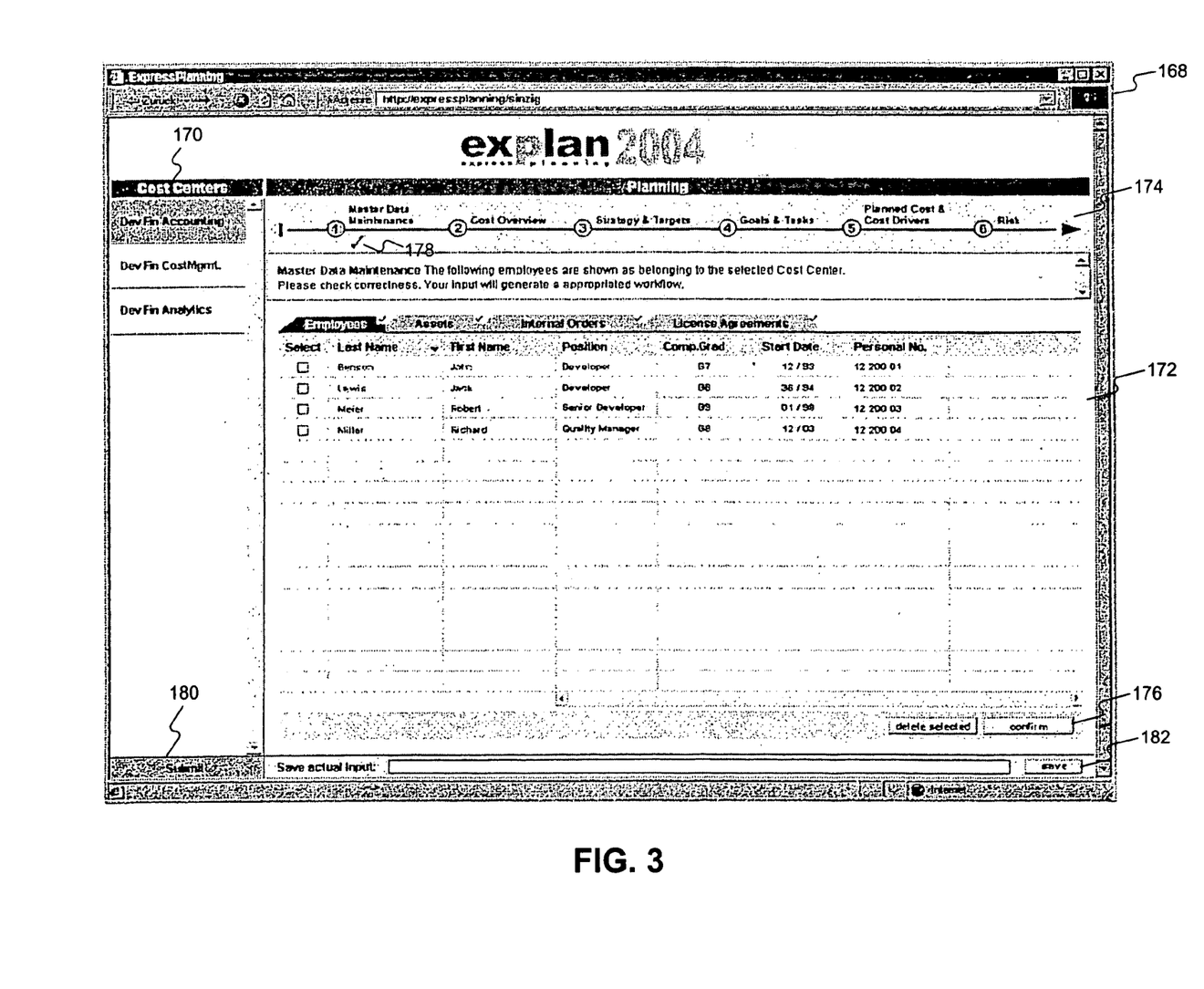
FIG. 3 is a data entry form for a line manager's entry of business planning data.

FIG. 3 shows a window 168 with a data entry form that has been received by one of the line managers. The window 168 has a portion 170 that lists all cost centers for which planning data is to be entered. The cost center for which data is currently entered, i.e. 'DevFinAccounting', is highlighted.

The window 168 has a data entry window 172 that serves for entry of the user data, i.e. the planning data in the example considered here. The data entry window 172 has a number of tabs, i.e. 'employees', 'assets', 'internal orders', 'license agreements' for the line manager's entry of respective planning data related to the currently processed cost center, i.e. 'DevFinAccounting'.

For completion of the data entry for the cost center 'DevFinAccounting' the line manager has to go through a sequence of data entry windows 172. This sequence of data entry windows 172 is represented by a sequence 174 of icons that is displayed above the data entry window 172. Such as sequence is also referred to as a 'train'. The sequence 174 of icons has icon 1 'master data maintenance', icon 2 'cost overview', icon 3 'strategy and targets', icon 4 'goals and tasks', icon 5 'planned cost and cost drivers', and icon 6 'risk'. Although not shown in FIG. 3, other icons may be displayed in sequence 174 in addition to icons 1-6.

The data entry window 172 that is currently displayed in the window 168 is the 'master data maintenance' window that is represented by the icon 1. When the confirm button 176 of the data entry window 172 is clicked by the user this signals that entry of the planning data into the data entry window 172 has been completed. In response a check mark 178 is displayed next to the icon 1 'master data maintenance'.

By clicking on icon 2 'cost overview' a respective data entry window opens for entry of the cost overview related user data, etc. After all user data has been entered for all cost centers shown in the portion 170 the user can click on the submit button 180 for uploading of the user data to the web portal.

If the user needs to interrupt the entry of the planning data he or she can save the previously entered data by clicking the save button 182. In response the partially completed user data is stored in the temporary storage of the web portal (cf. temporary storage 118 of FIG. 1) or on the hard disc of the personal computer used by the line manager for the data entry.

Figure 4:
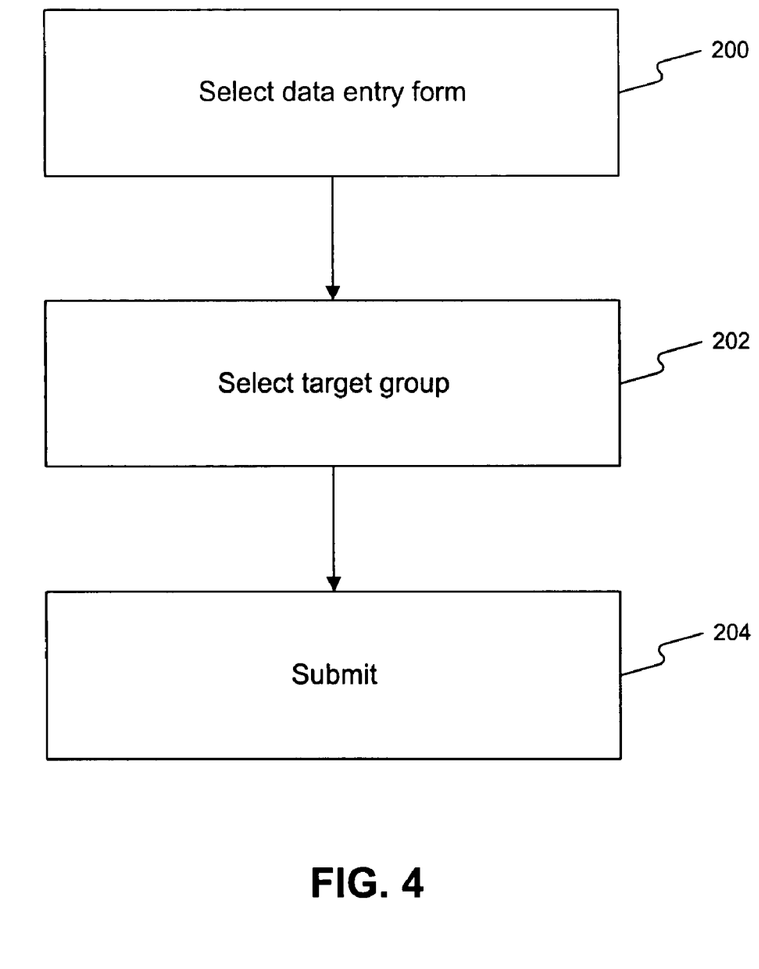
FIG. 4 is a flowchart illustrative of the planning coordinator's preparation of the collection of the business planning data.

FIG. 4 shows a flowchart that illustrates the preparatory phase for the collection of the user data. The preparatory phase is performed by the planning coordinator. In step 200 the planning coordinator connects to the web portal by means of his or her personal computer or by means of another suitable client device. One of the data entry forms that is stored on the web portal is selected by the planning coordinator. Alternatively, the planning coordinator uploads a newly created data entry form to the web portal for use in the user data collection process.

In step 202 the planning coordinator selects one of the target groups that are stored on the web portal. Alternatively the planning coordinator uploads a new target group for the collection of the user data. The planning coordinator may or may not specify the start date for the collection process of the user data. In step 204 the planning coordinator clicks on a submit button in order to upload the selection of the data entry form, the selection of a target group and the start date, if any, to the web portal in order to initiate the collection process of the user data.

Figure 5:
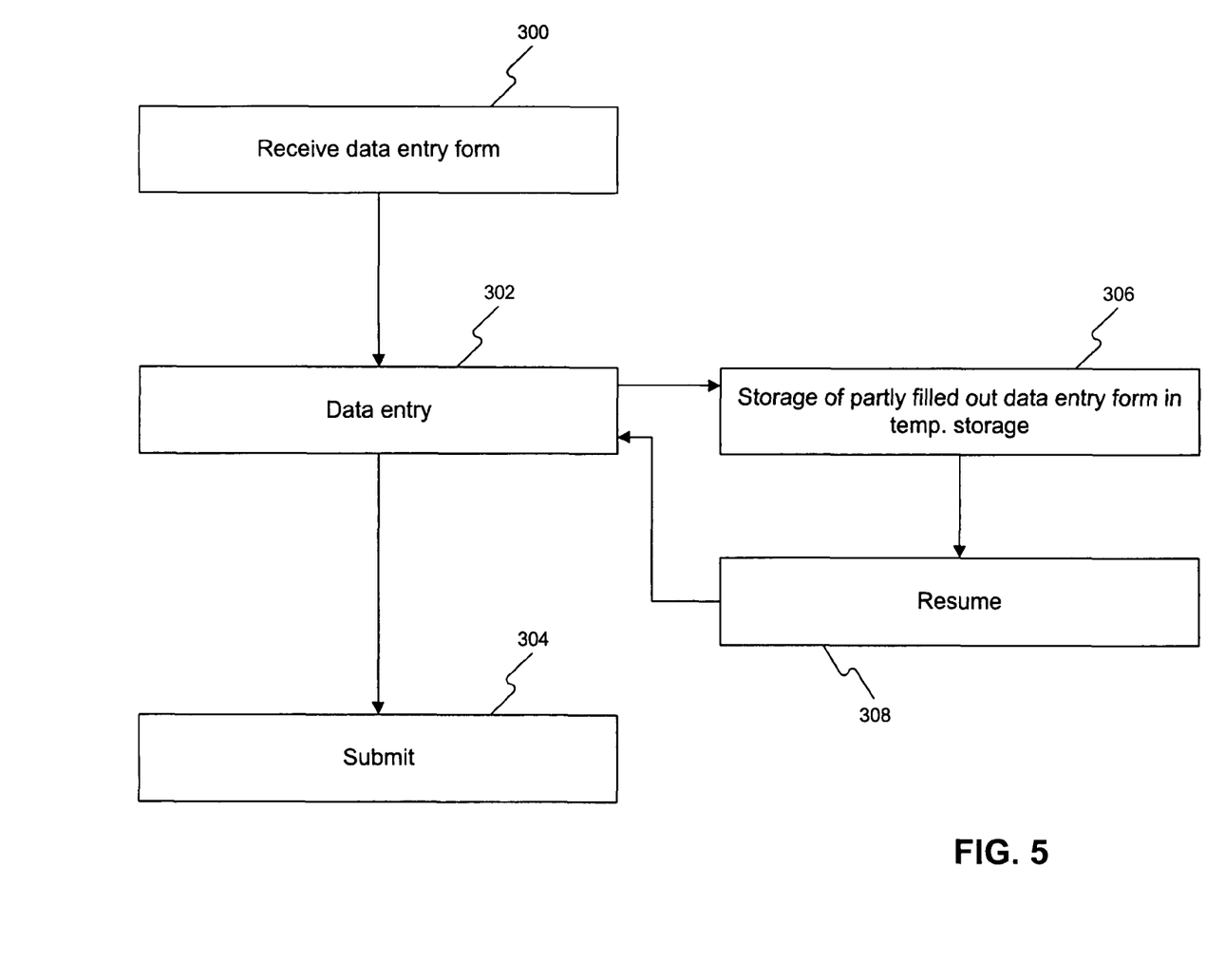
FIG. 5 is a flowchart illustrative of the data entry process of business planning data by a line manager.

FIG. 5 illustrates the entry of user data, e.g. business planning data, by a user, such as a line manager, after receipt of the data entry form.

The data entry form is received in step 300, such as an email attachment or as a hyperlink. In step 302 the user enters the business planning data into the data entry form by going through a sequence of data entry windows (cf. data entry window 172 of FIG. 3). After completion of the data entry, the user clicks on the submit button (cf. submit button 180 of FIG. 3) in order to upload the business planning data to the web portal for further processing.

If the line manager needs to interrupt the data entry due to a sudden more urgent business task the user data that has been entered so far by the line manager is temporarily stored in step 306. The temporary storage can be performed with or without the data entry form on the web portal and/or locally on the line manager's user device. When the line manager resumes the data entry in step 308 he or she does not need to re-enter the previously entered user data as these user data is recovered from the temporary storage.

Figure 6:
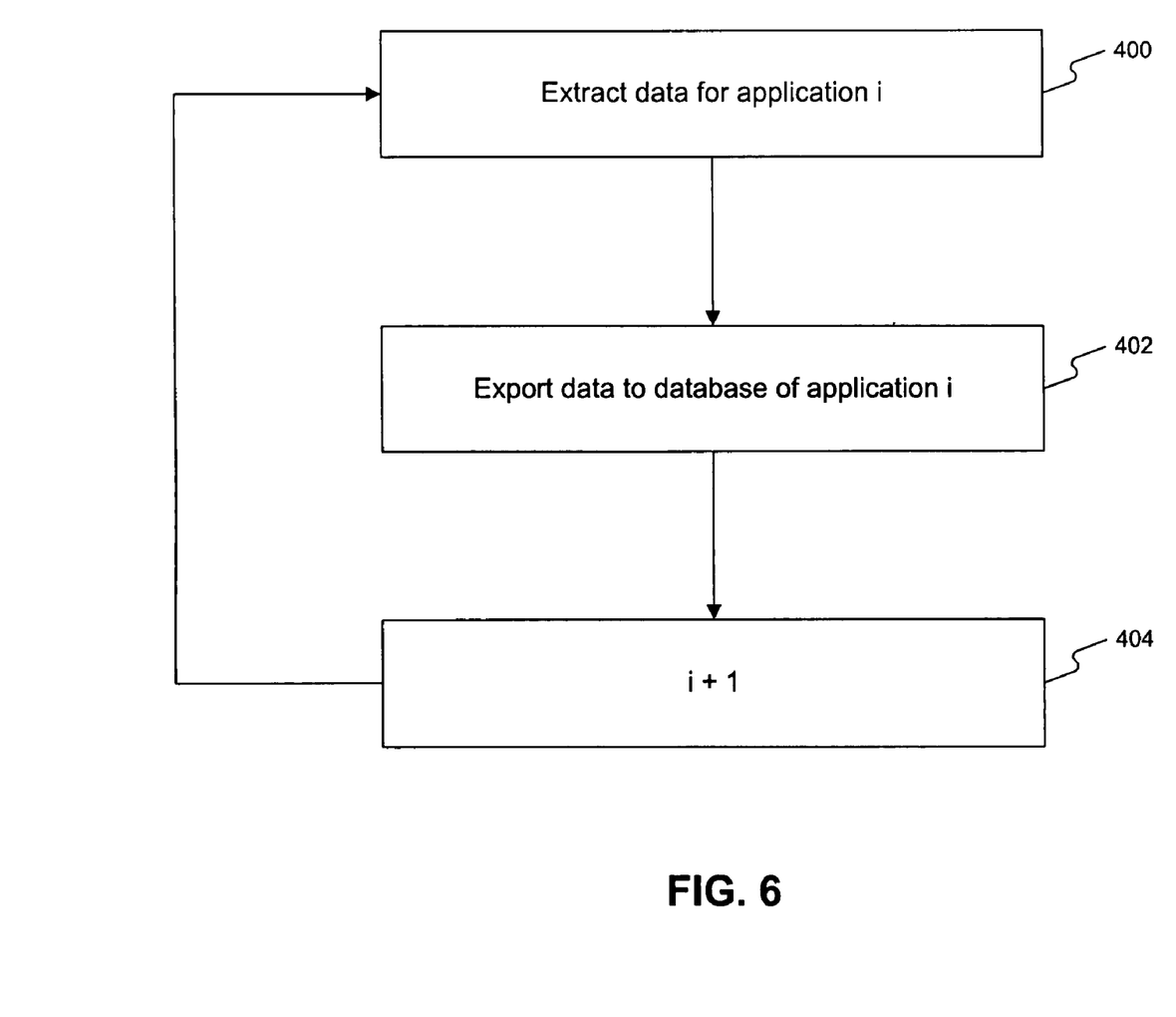
FIG. 6 is a flowchart illustrative of the extraction of uploaded business planning data for various applications.

FIG. 6 shows a flowchart illustrating the extraction of uploaded user data for the purpose of further processing by various application programs.

After the completed data entry forms have been received from all users of the selected target group, the services (cf. services 122 of FIG. 1) are started for providing application specific sub-sets of the user data to respective application programs. In the embodiment considered here, this is done sequentially for the application programs.

In step 400 user data that is required by application program i is extracted from the database. In step 402 the extracted data is exported to the application program i for further processing by the application program i. In step 404 the index i is incremented in order to perform the same procedure for the consecutive application program.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of entering user data by using a client device, the method comprising:

receiving a selection made by a planning coordinator of one or more contact lists stored in a storage device, each list including user identifiers corresponding to members of a target groups of users;

receiving a selection made by the planning coordinator of one or more data entry forms from among a plurality of data entry forms stored in the storage device;

receiving a notification indicating that a one or more target groups of users have been selected by the planning coordinator to input user data into the one or more data entry forms selected by the planning coordinator;

receiving, by the one or more selected groups of users, the one or more selected data entry forms from a web portal, each selected data entry form having a plurality of data entry windows and a sequence of icons, each icon being representative of the one of the data entry windows;

entering, by the one or more selected groups of users, user data into the data entry windows starting with the data entry window being represented by the first icon of the sequence of icons, wherein a completion mark is displayed next to the first icon in response to completion of the data entry into the data entry window represented by the first icon; and invoking a plurality of services to extract sub-sets of the data collected from the one or more selected groups of users, wherein each extracted sub-set of data includes application program-specific data that is compatible with a respective application program executed by the client device that invoked at least one of the plurality of services.

2. A non-transitory storage medium comprising computer executable instructions being executed on a processor for performing a method in accordance with claim 1.

3. A data processing system comprising:
a web portal adapted to receive, from a planning coordinator, a selection of one or more of a plurality of data entry forms and a selection of one or more of a plurality of target groups of users, each target group of users comprising a list of group member identifiers, and to send a notification to the members of the selected one or more target groups of users by using the group member identifiers, the notification instructing the members of the selected one or more target groups of users to input data using the selected one or more data entry forms;
a database for storing data collected from the selected one or more target groups of users in a storage device within the web portal; and
a data processor executing instruction to run a plurality of services, the plurality of services being invoked to extract sub-sets of the data collected from the selected one or more groups of users, wherein each extracted sub-set of data includes application program-specific data that is compatible with a respective application program that invoked at least one of the plurality of services.

4. The data processing system of claim 3, wherein the notification is sent by an email program included in the web portal.

5. The data processing system of claim 3, further comprising a temporary storage for temporarily storing a partially filled out data entry form until the data entry into the selected data entry form has been completed.

6. The data processing system of claim 3, further comprising a storing a plurality of data entry forms in the web portal for the planning coordinator's selection of one of the data entry forms to be provided to the selected group of users.

7. The data processing system of claim 3, the selected data entry form having a sequence of icons each icon being representative of a data entry window of the selected data entry form.

8. The data processing system of claim 7, each data entry window having a first button for completion of data entry into the data entry window, wherein a completion mark is displayed next to the icon representing the data entry window for which the data entry has been completed.

9. The data processing system of claim 7, the selected data entry form further comprising a display window for display of a list of the data entry windows for which data entry is to be performed by the selected group of users.

10. The data processing system of claim 3, the selected data entry form having a plurality of data entry fields for entry of business data, business planning data, financial data, human resources data, budget data, scenario planning data, and/or other business related data.

11. The data processing system of claim 3, further comprising a user device that modifies the selected data entry form and the selected group of users before the notification is sent.

12. The data processing system of claim 11, wherein a planning coordinator uses the user device to set a start date to begin collection of the user data from the selected group of users such that the notification is sent to the selected group of users when the start date is reached.

13. A method of providing user data stored in a storage device of a web portal, to a plurality of application programs, the method comprising:
receiving a selection made by a planning coordinator of one or more contact lists stored in a storage device, each list including user identifiers corresponding to members of a target groups of users;
receiving a selection made by the planning coordinator of one or more data entry forms from among a plurality of data entry forms stored in the storage device;
sending a notification to the one or more selected groups of users, the notification instructing the one or more selected groups of users to input data using the one or more selected data entry forms;
storing data collected from the one or more selected groups of users in the storage device; and
invoking a plurality of services to extract sub-sets of the data collected from the one or more selected groups of users, wherein each extracted sub-set of data includes application program-specific data that is compatible with a respective application program that invoked at least one of the plurality of services.

14. A storage device comprising computer executable instructions being executed on a processor for performing a method in accordance with claim 13.

15. A client device accessible by a selected group of users, comprising:
means for receiving a selection made by a planning coordinator of one or more contact lists stored in a storage device, each list including user identifiers corresponding to members of a target groups of users;
means for receiving a selection made by the planning coordinator of one or more data entry forms from among a plurality of data entry forms stored in the storage device;
means for receiving a notification indicating that the one or more groups of users have been selected by the planning coordinator to input user data into the one or more data entry forms selected by the planning coordinator;
means for receiving the one or more selected data entry forms from a web portal, the one or more selected data entry forms including a plurality of data entry windows and a sequence of icons, each icon representing one of the data entry windows;
a graphical user interface for displaying the one or more selected data entry forms, the graphical user interface being adapted to display a completion mark next to one of the icons after completion of data entry, by the one or more selected groups of users, into a data entry window represented by that icon; and
means for invoking a plurality of services to extract sub-sets of the data collected from the one or more selected groups of users, wherein each extracted sub-set of data includes application program-specific data that is compatible with a respective application program executed by the client device that invoked at least one of the plurality of services.

16. The client device of claim 15, the selected data entry form having a data entry window being represented by the last icon in the sequence of icons for display of user data that has been previously entered.

17. The client device of claim 15, the first data entry form having a portion for display of a list of the data entry windows for which data entry is to be performed by a user.

18. A data processing system comprising:
a user device accessible by a planning coordinator; and
a web portal comprising:
- a storage device storing a plurality of data entry forms and a plurality of target groups of users, the target groups including email addresses of the users;
- an email program sending email messages to users of a selected group of users, the email messages being sent when the web portal receives a selection of the selected group of users and of one of the data entry forms from the user device, the selections being made by the planning coordinator and the email messages instructing the group of users to input data into the selected data entry form;
- a temporary storage temporarily storing user data entered into the selected data entry form by the selected group of users when a user from the selected group of users interrupts a data entry session and resumes data entry during a later data entry session;
- a database for storing the entered user data and corresponding database keys, the database keys identifying user data that is entered by specific users from the selected group by correlating the data entered by each user with an identifier associated with that specific user; and
- a plurality of services, the plurality of services being invoked to extract sub-sets of the data collected from the group of users, wherein each extracted sub-set of data includes application program-specific data that is compatible with a respective application program that invoked at least one of the plurality of services.

19. The data processing system of claim 18, wherein the planning coordinator uses the user device to modify the selected data entry form and the selected group of users before the email messages are sent.

20. The data processing system of claim 18, wherein the planning coordinator uses the user device to set a start date to begin collection of the user data from the selected group of users such that the email messages are sent to the selected group of users when the start date is reached.

* * * * *